United States Patent [19]

Kobayashi et al.

[11] Patent Number: 4,912,574
[45] Date of Patent: Mar. 27, 1990

[54] APPARATUS FOR RECORDING DIGITAL SIGNAL

[75] Inventors: Masaharu Kobayashi, Hiratsuka; Takao Arai; Takaharu Noguchi, both of Yokohama, all of Japan

[73] Assignee: Hitachi, Ltd., Tokyo, Japan

[21] Appl. No.: 179,305

[22] Filed: Apr. 8, 1988

[30] Foreign Application Priority Data

Apr. 10, 1987 [JP] Japan ................................. 62-86826

[51] Int. Cl.$^4$ ......................... G11B 15/04; G11B 5/03
[52] U.S. Cl. ......................................... 360/60; 360/66
[58] Field of Search ....................... 360/60, 61, 62, 64, 360/68, 13, 14.1, 27, 28, 66

[56] References Cited

U.S. PATENT DOCUMENTS 4,549,229 10/1985 Nakano et al. ........................ 360/64

Primary Examiner—Vincent P. Canney
Attorney, Agent, or Firm—Antonelli, Terry & Wands

[57] ABSTRACT

The present invention relates to an apparatus for recording a digitized signal. If a recording apparatus is switched from a recording mode to a non-recording mode and then switched from the non-recording mode to a recording mode, there is produced a portion between two records where the records are not continuous. When such a portion is reproduced, abnormal data come to be reproduced because of existence of discontinuity between the prior and subsequent data. And, if a digital audio signal is similarly recorded, it follows that an abnormal sound is generated when such a portion is reproduced. Then, by recording an anti-format signal in the discontinuous portion, the reproduction of abnormal data or generation of abnormal sound can be prevented from occurring.

7 Claims, 7 Drawing Sheets

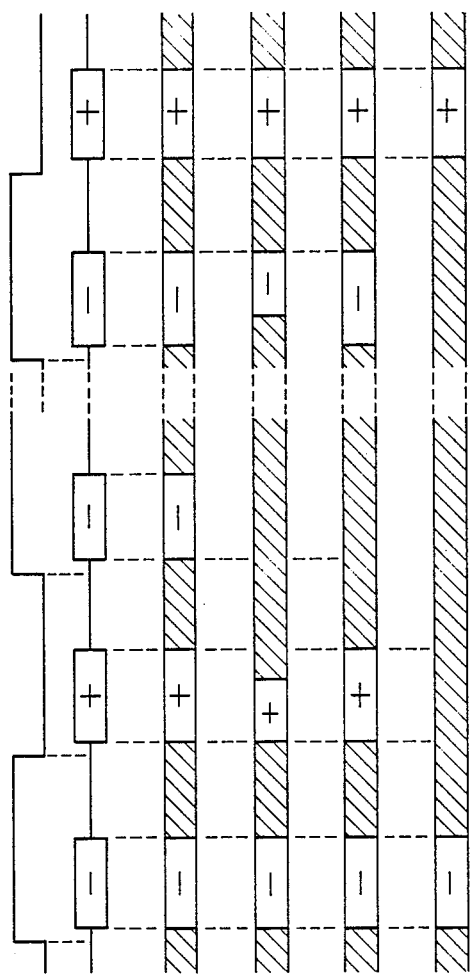

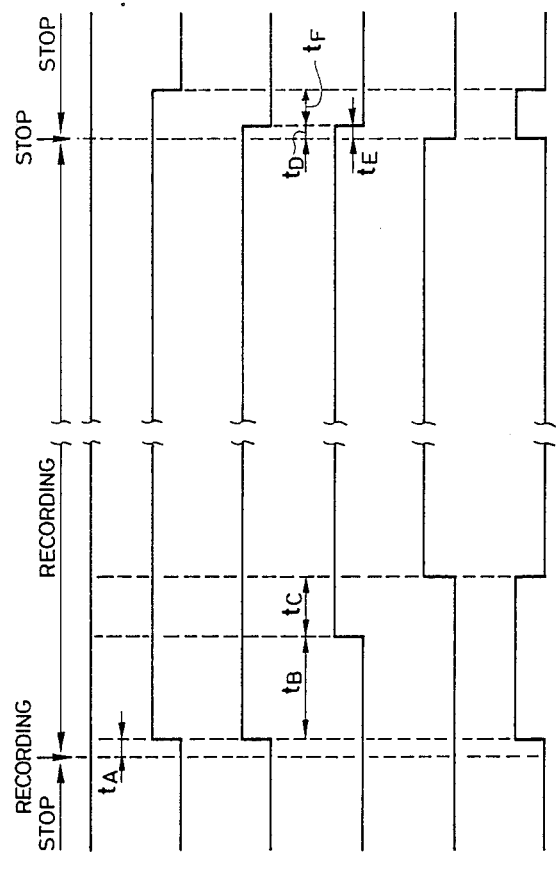

APPARATUS FOR RECORDING DIGITAL SIGNAL

BACKGROUND OF THE INVENTION

The present invention relates to a digital audio tape recorder and, more particularly, to a recording system suitable for application thereto when recording and stopping are repeated therein.

Prior art apparatus of such a type are known, for example, from disclosure in U.S. Pat. Nos. 4227221, 4309726, 4617599, 4677622, 4649542, 4594621, 4646301, 4704640, 4646170, and 4660200. In these prior art apparatus, however, consideration has not been given to such problems as that an erroneous correction is made on account of slippage or discontinuity of the interleaving existing at the portion between records previously recorded and subsequently recorded.

SUMMARY OF THE INVENTION

An object of the present invention is the provision of an apparatus in which no erroneous correction will be made.

The above object is achieved by recording anti-format data in a discontinuous portion between records.

That is, occurrence of abnormal recording of format data or mixing of data where records are discontinuous can be eliminated by recording the non-format data during the period before the recording system stops when recording is stopped, and/or during the period before the recording system reaches a stable state when recording is started.

Such effects are obtained that errors occurring at the time of decoding of the error code and de-interleaving of the preceding and the subsequent data can be eliminated by recording anti-format data track in the portion where records are discontinuous between the preceding and subsequent data tracks, that a record remaining unerased at the time of stopping can be eliminated and, also, abnormality in the track pitch and track angle of inclination due to a slowed down tape feed as well as abnormality in the data area and data contents due to a slowed down cylinder rotation can be eliminated by recording anti-format data before the recording is stopped, and that abnormality in the data recorded before the tape feed is stabilized and before the cylinder rotation is stabilized can be eliminated by recording anti-format data for a predetermined period of time when the recording is started.

BRIEF DESCRIPTION OF THE DRAWINGS

FIGS. 5 through F are a timing chart for describing recording of anti-format data;

FIGS. 7A through F a timing chart for describing switching signals.

DESCRIPTIONS OF THE PREFERRED EMBODIMENT

Figure 1:
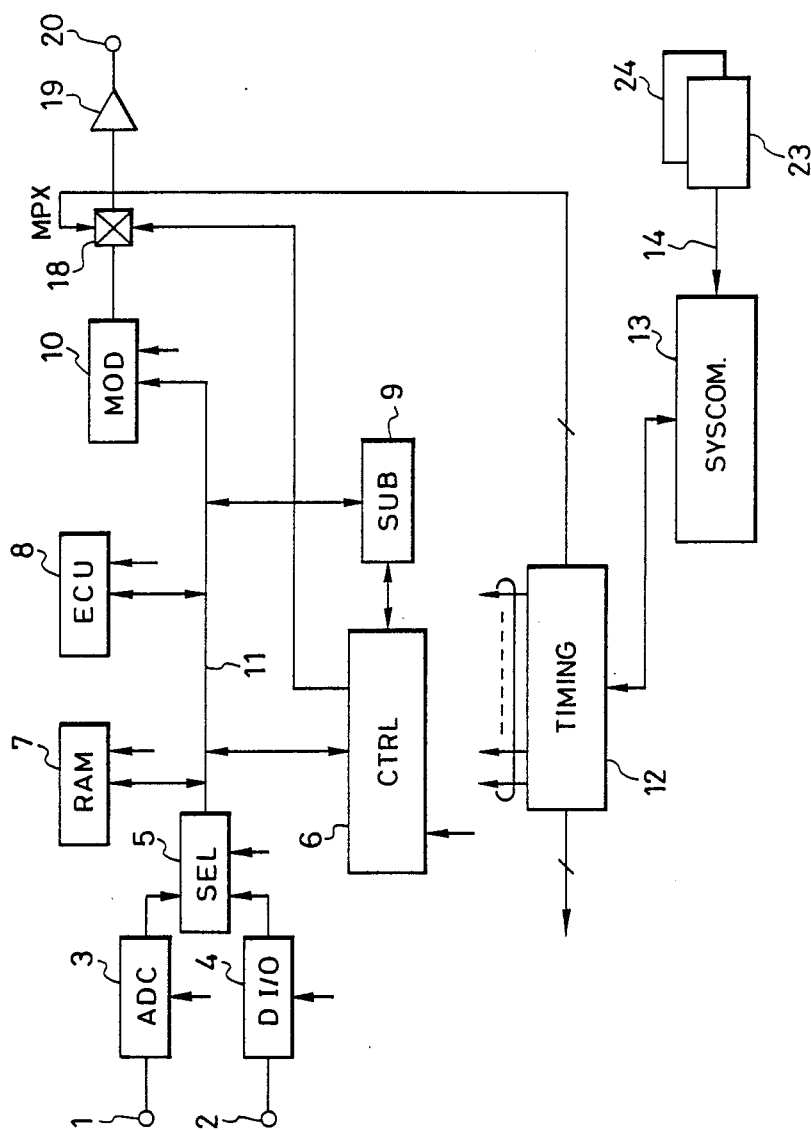
FIG. 1 is a circuit block diagram showing an embodiment of the present invention.

A first embodiment of the present invention will be described below with reference to FIG. 1. A signal from an analog signal input terminal 1 is converted into a digital signal at a predetermined sampling frequency and with a predetermined number of quantized bits in an analog-to-digital converter portion 3 and input to a selector portion 5. Predetermined data are extracted from a signal from a digital signal input terminal 2 in a digital input portion 4 and the data are input to the selector portion 5. The selector portion 5 selects an input signal and converts it into a signal with a predetermined number of bits to be output to a data bus 11.

The outputs from the selector portion 5 delivered at the data bus 11 are successively stored in a memory 7. The data stored in the memory 7 are read out in predetermined sequence and encoded in an error correction encoder portion 8. The encoded data are read out of the memory 7 in predetermined sequence and modulated in a modulator circuit 10 together with a signal from a subcode generator circuit 9.

The modulated output from the modulator circuit 10 is input to a selector portion 18.

The selector portion 18 is further supplied with an anti-format signal, for example, a pulse at the frequency of 4.702 MHz, from a control circuit 6, and makes a selection according to a signal from a timing circuit 12.

The selected output from the selector circuit 18 is amplified in a recording amplifier 19 and input to a head system (not shown).

Here, the controlling or the like of the memory 7 is performed based on signals from the control circuit 6 and the timing circuit 12.

Further, the timing circuit 12 and the control circuit 6 perform processing in response to a signal from a system control circuit 13.

And, the system control circuit 13 performs signal generation, controlled from a keyboard 23 or a remote control input 24.

When a recording is stopped for some time and then another recording is resumed, there are produced abnormalities in track patterns, track pitches, track angles of inclination, azimuth angles, and so on, at the end and start of the recording.

When a DAT (Digital Audio Tape recorder) is used, an abnormal sound occurring even one time or only for a moment is not allowed, and it is required at the time of record selection that the recordable state is reached as soon as possible, and further, motion of the mechanical system must be simple and speedy.

Accordingly, the present invention was arranged as shown in FIG. 1 to record anti-format signals on the tape during predetermined periods at the end and start of recording.

Figure 2A:
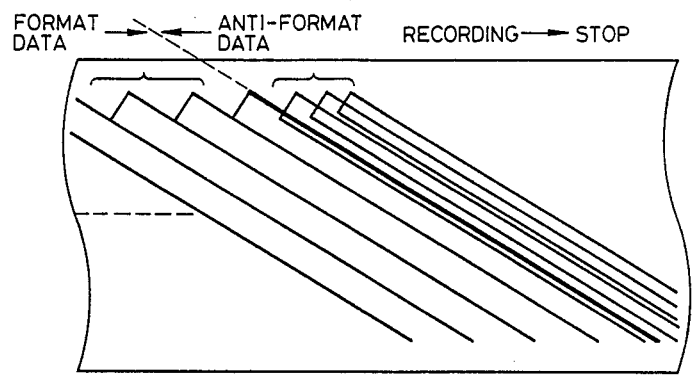
FIGS. 2A to 2C are diagrams showing record patterns on tapes.
Figure 2B:
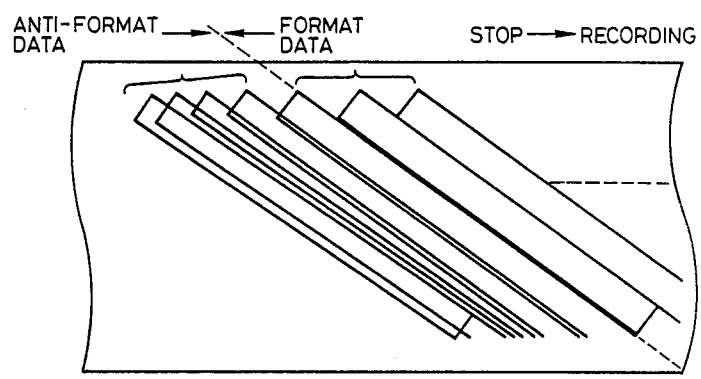
Figure 2C:
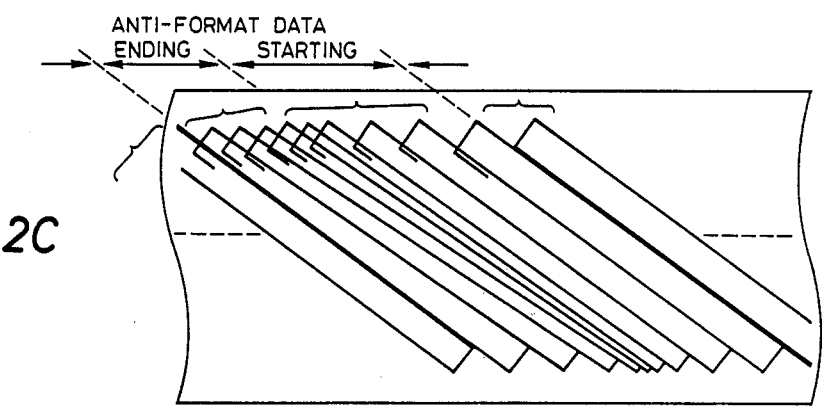

FIGS. 2A, 2B, and 2C are for showing recorded tracks on tapes when the records were made with the use of a rotary head When the apparatus in its recording state is brought into the stopped state, anti-format data are recorded for a predetermined period after recording of format data has been stopped, whereas when the same is brought from the stopped state into a recording state, anti-format data are recorded for a predetermined period and thereupon format data are recorded.

Similar effect to that obtained from the above procedures may be provided even if the recording of the anti-format data is performed only in one of the aforesaid two transitional operations.

As the anti-format data, a recording signal whose frequency, for example, is 4.702 MHz is used. But, a signal of another frequency may provide similar effect if it can erase previously recorded signals or format data.

FIG. 2A shows the case of transition from a recording state to the stopped state, in which recording of format data is stopped according to a stopping control signal and then anti-format data data are recorded for a predetermined period. Accompanying the stopping operation, the track pitch, angle of inclination, and so on may be changed, but operations in the signal processing system at the time of reproduction will not encounter any problem because they are anti-format data FIG. 2B shows the case of transition from the stopped state to the start of recording, in which anti-format data are recorded for a predetermined period according to a record starting control signal and then format data are recorded. At this time, if, for example, the recording of the anti-format data is started simultaneously with the record starting control signal, then it may occur that the recording is made on the tape in the stopped state, but there is no problem produced from such overwriting because the data are anti-format data.

FIG. 2C shows record patterns produced in the boundary area when a recording is resumed after a stopped recording. There are recorded both the anti-format data made at the time when the preceding recording was stopped and at the time when the subsequent recording was started.

As described in the foregoing, anti-format data are not dependent upon the track pitch or track format, and therefore, it provides an advantage that it does not interfere with decoding or de-interleave processing at the time of reproduction.

Further, by recording anti-format data at the time when the tape is just started to be fed, old data remaining unerased or abnormal recording can be prevented from occurring even if recording operation is performed without reversing the tape.

Figure 3A:
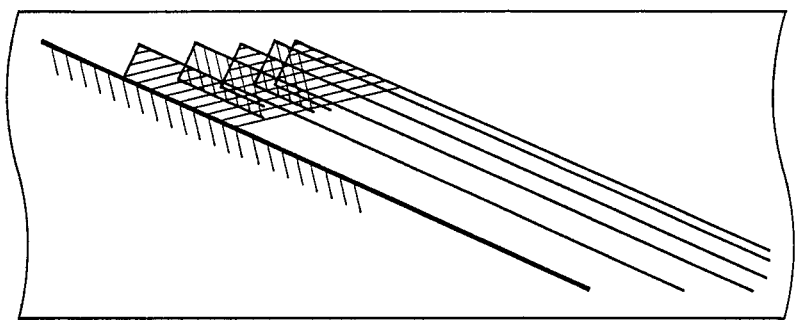
FIGS. 3A and 3B are diagrams showing patterns on tapes at the time when the tapes are fed and stopped.
Figure 3B:
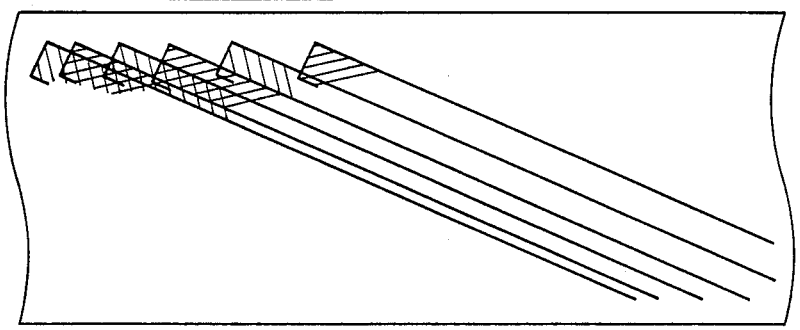

FIG. 3A shows recorded patterns on a tape in the transition from a recording state to a non-recording (e.g., recording stopped) state, whereas FIG. 3B shows them in the transition from a non-recording (e.g., recording stopped) state to a recording state. In either case, there are sometimes caused disturbances in the track format such as that of the track pitch occurring in the track pattern or that of the signal record area within a track during the periods of time until the tape feed is stopped or stabilized.

For example, when the tape feed is slow, the track pitch becomes narrower and when the cylinder rotation is slow or phasic synchronization is not provided therefor, abnormality occurs in the signal record area.

When such a signal is reproduced, it sometimes occurs that a reproduced signal is output in which signals of different tracks are taken as signals of the same track or a wrong combination of track signals is included.

In the former case, since different groups each thereof constituting an error correction signal are combined, abnormal data due to erroneous correction, erroneous detection, or the like are output.

In the latter case, odd-numbered data and even-numbered data at wrong timing come to be combined. In either case, there is a risk of occurrence of an abnormal sound.

Further, when the track format is disturbed, it incurs such risks that accurate encoding may become unable to be processed in the encoder circuit 8 and wrong data are thereby recorded, wrong data in the subcode area or the like may be picked up as the data in the PCM area, and a sufficient number of data may not be picked up, and hence, at the time of decoding in the reproduction, erroneous decoding may be made, or erroneous de-interleaving may be made.

Figure 4A:
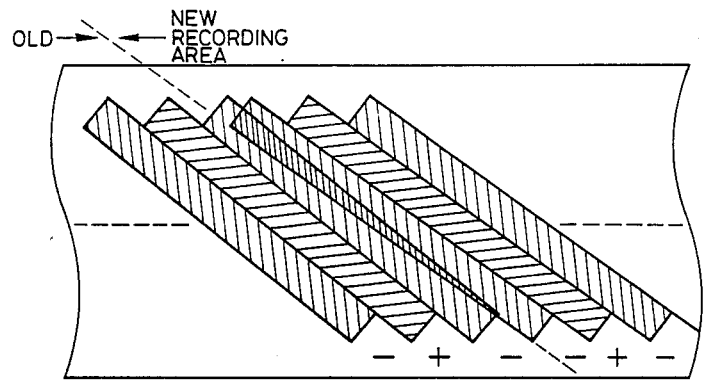
FIGS. 4A to 4C are diagrams showing patterns on tapes at the portion where records are discontinuous.
Figure 4B:
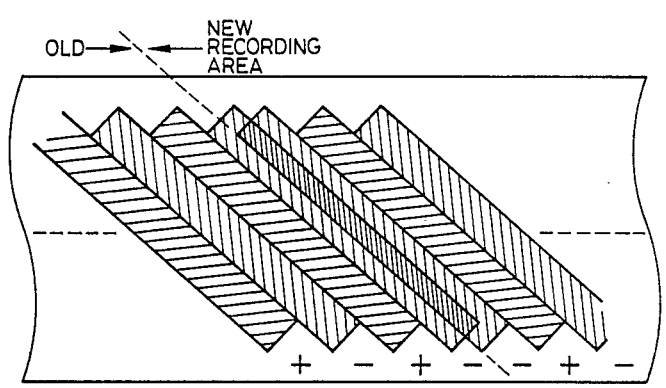
Figure 4C:
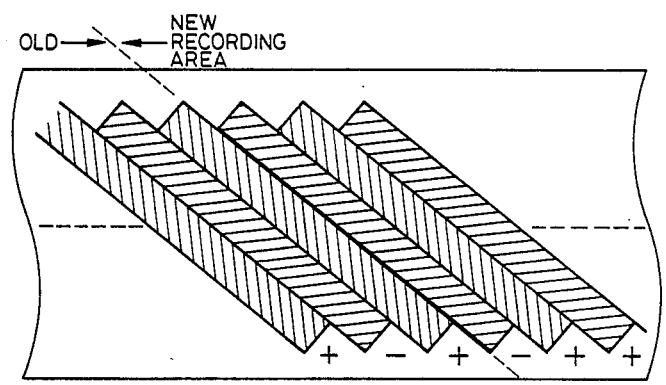

FIGS. 4A to 4C are for showing states of recording between the data previously recorded (old record area) and the data subsequently recorded (new record area).

FIG. 4A shows a case where azimuth angles of both the new and old data are in agreement but the degree of overlapping of them is different between the entrance side and the exit side, whereas FIG. 4B shows a case where both their azimuth angles are in agreement but the track width has become narrower. In such cases, reproduced signal from the portion in question sometimes becomes a mixture of new and old data. In the case of FIG. 4A, for example, the old data is picked up in the first half of the reproduced signal, while the new data is picked up in the second half. As a result, a data slippage is produced and the possibility of occurrence of erroneous correction will increase.

FIG. 4C shows a pattern in which a + (plus) azimuth of the old data is contacting a − (minus) azimuth of the new data. The audio signal is recorded such that the even-numbered samples and odd-numbered-samples of the audio signal samples within a predetermined period (two frames) are distributed to different tracks, with the + and − azimuth tracks taken as a set.

Therefore, when recording has been made as shown in FIG. 4C, the old data and the new data are turned out to be output alternately for each sample.

Thus, there are involved problems in all the cases of the above FIGS. 4A, 4B, and 4C.

Even if a zero signal of audio signal (analog zero pattern or digital zero pattern) is interposed between both the signals, the same problems may be encountered.

The problems are solved by inserting anti-format data between both the signals.

FIGS. 5A to 5F are waveform diagrams delivered at the output terminal of the switching circuit 18 at the time of switching between format data and anti-format data.

FIG. 5A shows a head switching signal waveform and FIG. 5B shows a waveform in the case where signals are delivered only at the PCM areas (90° areas), of which symbols +, − indicate the signals recorded by + azimuth and − azimuth heads, respectively.

FIG. 5C shows an anti-format signal of a rectangular waveform at the repetition frequency, for example, of 4.704 MHz, existing in the areas other than the PCM areas.

FIG. 5D shows a waveform example when switching was made out of synchronism with the PCM area, i.e., in the transition Recording → Stop, the switching is made in the middle of recording by the + azimuth head, whereas in the transition Stop → Recording, the switching is made in the middle of recording by the − azimuth head.

FIG. 5E shows an example of switching made in synchronism with the PCM area but without respect to + or − azimuth, while FIG. 5F shows an example of switching made in synchronism with the PCM area and, besides, made such that, when recording is stopped, it ends at − azimuth and when recording is resumed it starts at + azimuth.

In the case of FIG. 5F above, ending or starting are made where the respective areas are completed, and therefore, occurrence of abnormal sound at the time of reproduction can be prevented.

Figure 6A:
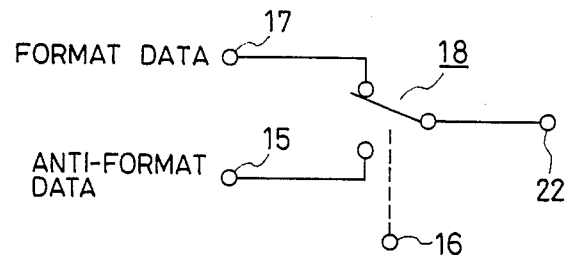
FIGS. 6A to 6C are diagrams for data switching circuits.
Figure 6B:
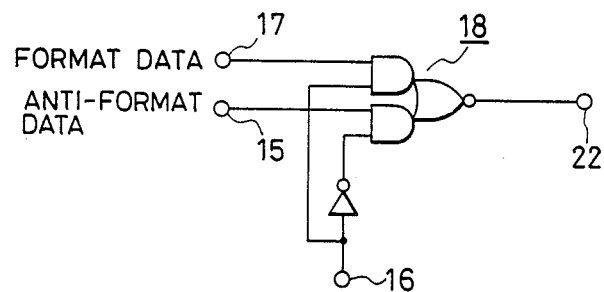
Figure 6C:
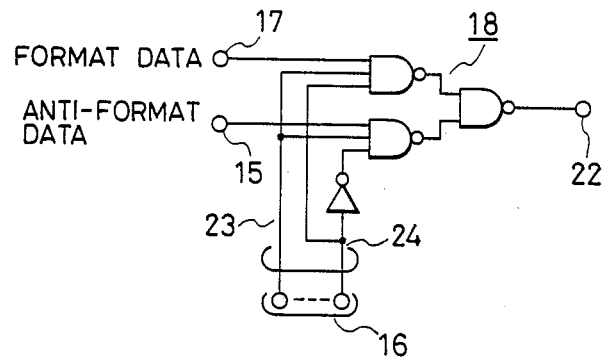

FIGS. 6A to 6C show examples of switching circuits between format data and anti-format data.

A signal group made up of signals formatted according to a predetermined signal format, such as a subcode signal, PCM signal, and a tracking signal, and an anti-format signal, for example, a signal at 4,702 MHz, are switched to each other by means of the output switching circuit 18 in response to an output switching control signal.

FIG. 6A is a fundamental circuit diagram of the switch 18, and FIGS. 6B and 6C are circuit diagrams when the same is constructed of logic gates.

For example, FIG. 6B is constructed of two 2-input AND gates, a 2-input NOR gate, and an inverter, whereas FIG. 6C is constructed of a 2-input NAND gate, two 3-input NAND gates, and an inverter, and the switching between format data and anti-format data is performed according to a signal from an output switching control signal input terminal 16, and also, blocking of an output in the non-recording mode (e.g., the reproducing mode) is performed.

That is, an output blocking signal 23 is turned to "0" when no recording is made and thereby an output terminal 22 is brought to "0". The signal 23 is turned to "1" at the time of recording, whereby either format data or anti-format data selected by a selecting signal 24 is delivered at the output terminal 22. For example, anti-format data is selected when the selecting signal is "0", while format data is selected when the signal is "1".

FIGS. 7A to 7F are timing charts for transitions from stopping to recording and from recording to stopping. Description will be given below with reference to the charts.

FIG. 7A shows the operating timing from a keyboard or remote controller for recording or stopping.

FIG. 7B shows a recording mode signal, which is set up a delay time $t_A$ after the inputting given from the recording keyboard or the like, or set up a delay time $t_D+t_F$ after the inputting given from the stopping keyboard, etc.

FIG. 7C shows a cylinder rotating signal which starts its control delay times $t_A$, $t_D$ after the inputting given from the keyboard or the like.

FIG. 7D shows a tape feeding signal which starts the feed a delay time $t_B$ after the start of the cylinder rotation and stops the feed a delay time $t_E$ after the keyboard inputting or the like.

FIG. 7E shows a format data recording signal which starts recording a delay time $t_C$ after the start of the tape feed and stops the recording at the stopping timing.

FIG. 7F shows an anti-format data recording signal.

Through the above described operations, the tape feed is started after the cylinder rotation has been stabilized and recording of the format data is started after the tape feed has been stabilized, whereas recording of the anti-format data is performed during the period from the start of the tape feed to its reaching a stabilized state and during the period from the stopping instructing operation to the stopping of the tape feed.

Here, as the switching signals, the signals of FIG. 7B and FIG. 7C are used. The times until the stabilized state is reached of the cylinder rotation and the tape feed as well as the time until they are stopped are determined either by detecting the respective timing or set to predetermined values in advance. In the case where the cylinder is already rotating, the recording of anti-format data may be made until the tape feed becomes stabilized, and where the tape feed is already stabilized, the recording of the same may be made on one track at the least.

The times $t_A$, $t_D$, and $t_E$ correspond to time lags between inputting of operating information to the circuit by actuation of the recording mode and stopping mode from the keyboard or the like and generation of the processing signals in response to the information.

As to the rotation of the cylinder, both its number of revolution and its rotational phase must be synchronized. Although the former can reach a synchronized state rather soon, it takes a considerable time for the latter to be synchronized, sometimes taking several seconds. On the other hand, the tape feed achieves a virtually stabilized speed within approximately one second. No serious influence is produced from the margin and instability of the tape feed, but, when the rotation of the cylinder has a small margin of rotational phase and is also unstable, a bad influence is exerted on the data generation and extraction and so on, leading to occurrence of an abnormal sound (shock sound). For example, if the tape feed is also started simultaneously with the start of the recording, it follows that anti-format data are recorded until the cylinder rotation becomes stabilized. When the thus recorded tape is subjected to reproduction, since also control signals are not recorded in the anti-format data recording period, no indication can be provided and a silence period is produced. Establishment of operating conditions is achieved by key operation on the keyboard of the digital audio tape recorded. Processing responding to the keyboard operations is performed, for example, in the system control circuit 13. Here, the system control circuit 13 is functioned, for example, by means of a microcomputer. The system control circuit 13 employing such a microcomputer performs, with reference to the state prior to the keyboard operation, controlling of tape feed, cylinder rotation, and so on, switching between recording and reproducing modes, and generation of the switching signal between format signal and anti-format signal. Further, the system control circuit 13 may be able, other than controlling of the tape feed and cylinder rotation, to check whether they have reached a stable state, and thereupon, to cause next operations to be performed.

Here, as the timing of the operation entering into the recording state, combination with any of the following may be considered:

(1) When the tape is brought into the traveling state from its stopped state;

(2) When the tape is already in its traveling state;

(3) When the cylinder is brought into the rotating state from its stopped state;

(4) When the cylinder is already in its rotating state.

Namely, there are such cases as turned from the stopped state (STOP) into the recording state, from a temporarily stopped state (PAUSE) into the recording state, from a reproducing state (PLAY) into the recording state, and so on.

First, when a tape in its stopped state is started to travel, there is a time before the travel becomes stabilized, and when a cylinder in its stopped state is started to rotate, there is a time before the rotation becomes stabilized.

By arranging such that anti-format data are recorded during such times, recording of abnormal data can be prevented.

Here, the period of time during which the anti-format data are recorded is determined in two ways, by setting it in advance and by taking the time point when the stabilized state is detected.

Further, since the time until the cylinder rotation becomes stabilized is longer than the time until the tape feed is stabilized, the tape feed may be stopped until the cylinder rotation becomes stabilized, and upon its stabilization the tape feed may be started, whereby the silent period at the time of reproduction can be shortened.

In entering the recording state in the case where such a method is used as the recording is started after rewinding is made for a predetermined period or the recording is started after reproduction is made for a predetermined period, the anti-format signal is recorded for a predetermined period at the start of the recording. The period for recording the anti-format signal is made to be at least one track. Further, the same can be set to be, for example, until when the format signal can be started with a + azimuth, until when the format signal can be correctly formed. That is, when a reproducing state is switched to a recording state in the case where a signal processing system capable of both recording and reproducing is used, a predetermined period of time is required before right data are output. During that period, the recording may be restrained or an anti-format signal may be recorded.

The aforesaid operations will be described with reference to a concrete example in the following. The control for causing the system to enter into the recording mode is provided by a keyboard or remote controller operation, or by a timer operation. More particularly, there are such instances of the system entering into the recording state as caused by actuation of a recording (REC) switch from the keyboard or remote controller or by actuation of play (PLAY) or pause (PAUSE) switches or, in the timer recording mode, by turning on of the power supply. Upon entering into the recording state of the system, the cylinder when it has been stopped up to this moment is started to rotate but the tape is, for example, remains stopped for a predetermined period before the rotation becomes stabilized.

The tape is started to be fed after the predetermined period has elapsed for the cylinder rotation to reach a stabilized state. The anti-format data are recorded during the period from when the recording state is established to when the tape feed is stabilized after it has been started.

In the signal processing system capable of both recording and reproducing, a momentary switching from reproduction to recording is impracticable. Therefore, it is effective to record a formatted signal having a digital zero signal until the conditions for the recording signal are put in order.

Hence, by having a memory for storing the formatted signal with the digital zero signal in advance or having a dedicated circuit for generating such a signal, it becomes possible to output the format data the moment the reproducing mode is switched to the recording mode.

Here, since encoding the error correction code or generating the parity for the format data with the digital zero signal can be provided through simple processing, it can be additionally provided for a system arranged in an LSI circuit.

In the foregoing description, a signal at 4.704 MHz is used as the anti-format signal, but the anti-format signal is effective in the subcode and PCM data areas, and therefore, by arranging the tracking signal (ATF) to be a regular signal, an effect is obtained that good tracking can be achieved.

The fundamental frequency 4.704 MHz of the anti-format signal corresponds to ½ of the recording bit rate when the cylinder diameter is 30 mm, and therefore, when the cylinder diameter is different, the frequency may be made to correspond to the ½ of the respective bit rate.

According to the present invention, when recording after stopping is repeated in digital audio tape recordings or the like, such an effect is obtained, even if slippage or discontinuity of tracks or patterns at the boundary portion between two records is present, that abnormal sound or the like to be generated due to discontinuity of the interleave at the boundary portion can be reduced.

What is claimed is:

1. A digital signal recording apparatus comprising rotary head means having cylinder means for enabling recording on a movable magnetic tape, means for providing a digital signal with an error correcting code, first means for recording the encoded digital signal as a format signal on the movable magnetic tape utilizing the rotary head means, and second means for recording an anti-format signal on the movable magnetic tape in a portion thereof between a prior recording and a subsequent recording during at least one of the start and end of recording of the format signal where the recordings are discontinuous, the second means for recording the anti-format signal enabling recording thereof at the start of recording during a period of time at least one of when the magnetic tape is started to be fed from a stopped state thereof until the feed of the magnetic tape becomes stabilized, and when the cylinder means of the rotary head means is started to rotate from a stopped state thereof until the rotation of the cylinder means becomes stabilized.

2. A digital signal recording apparatus according to claim 1, further comprising means for starting feeding of the magnetic tape after the rotation of the cylinder means of the rotary head means has become stabilized, the second means enabling recording of the anti-format signal at the start of recording during a period of time representing the sum of a period from the start of recording until the rotation of the cylinder means of the rotary head means has become stabilized and a period from the start of feeding of the magnetic tape until the feed of the magnetic tape has become stabilized.

3. A digital signal recording apparatus according to claim 1, wherein the second means enables recording of the anti-format signal during a period of time at the end of recording when the first means is initiated to be in a stopped condition until recording is stopped.

4. A digital signal recording apparatus according to claim 1, wherein recording on the magnetic tape is effected in the form of oblique record tracks, the second means enabling recording of the anti-format signal on at least one track of the oblique record tracks, and the first means enabling recording of the format signal on at least one other track of the oblique record tracks.

5. A digital signal recording apparatus according to claim 1, wherein the recording on the magnetic tape is effected in the form of oblique record tracks and adjoining tracks alternately have first and second azimuth angles different from each other, the rotary head means enabling recording so that when the azimuth angle of the last track on which the prior recording is ended is the first azimuth angle, the azimuth angle of the first track on which the subsequent recording is started is the second azimuth angle.

6. A digital signal recording apparatus according to claim 5, wherein the second means enables recording during a period of time at the start of recording where the recording is started on the track having the second azimuth angle at least the period from the start of recording until the first means enables starting of recording of the format signal.

7. A digital signal recording apparatus according to claim 1, wherein the anti-format signal is a pulse signal at a predetermined frequency.

* * * * *